(12) United States Patent
Wu et al.

(10) Patent No.: US 9,596,068 B2
(45) Date of Patent: Mar. 14, 2017

(54) SYSTEM INFORMATION UPDATE FOR CARRIER AGGREGATION

(75) Inventors: Chunli Wu, Beijing (CN); Benoist Pierre Sebire, Tokyo (JP); Matti Jokimies, Salo (FI)

(73) Assignee: Nokia Solutions and Networks Oy, Espoo (FI)

( * ) Notice: Subject to any disclaimer, the term of this patent is extended or adjusted under 35 U.S.C. 154(b) by 1351 days.

(21) Appl. No.: 13/027,406

(22) Filed: Feb. 15, 2011

(65) Prior Publication Data

US 2011/0201323 A1 Aug. 18, 2011

Related U.S. Application Data

(60) Provisional application No. 61/304,562, filed on Feb. 15, 2010.

(51) Int. Cl.
| | |
|---|---|
| *H04M 3/00* | (2006.01) |
| *H04L 5/00* | (2006.01) |
| *H04W 48/16* | (2009.01) |
| *H04W 84/12* | (2009.01) |

(52) U.S. Cl.
CPC .......... *H04L 5/0091* (2013.01); *H04L 5/001* (2013.01); *H04L 5/0053* (2013.01); *H04W 48/16* (2013.01); *H04W 84/12* (2013.01)

(58) Field of Classification Search
CPC .............. H04W 72/005; H04W 48/12; H04W 72/0406; H04W 72/042; H04W 76/048; H04W 24/10; H04W 72/1278; H04W 72/1289; H04W 36/0055; H04W 36/0066; H04W 36/0072; H04W 72/04; H04W 36/0088; H04W 52/0212; H04W 8/26

USPC ....... 455/450, 434, 115.1, 432.2, 435.2, 464, 455/509, 515, 517, 555, 68; 370/329,
(Continued)

(56) References Cited

U.S. PATENT DOCUMENTS

| | | | |
|---|---|---|---|
| 2005/0085197 A1* | 4/2005 | Laroia et al. ................ | 455/101 |
| 2007/0287440 A1* | 12/2007 | Benkert ................ | H04W 24/04 |
| | | | 455/422.1 |

(Continued)

OTHER PUBLICATIONS

3GPP TSG RAN WG2 #67—Aug. 24, 2009, Shenzhen, CN—by Panasonic, Title: "System Information Modification Indication in Carrier Aggregation"—Agenda Item: 7.3.*

(Continued)

*Primary Examiner* — Fred Casca
(74) *Attorney, Agent, or Firm* — Harrington & Smith

(57) ABSTRACT

A method for providing system integration (SI) updates for a carrier aggregation system is described. The method includes, for each other component carrier (CC) of a configured set of CCs, determining a start time for the other CC when updated SI for the other CC becomes valid. A first time prior to each start time for the at least one other CC is determined. A message including the updated SI for the at least one other CC and an indication of the first time is sent on a first CC. A UE configured for a set of CCs receiving the message. For each CC of the configured set of CCs, a next time for the other CC which begins after the first time is determined and the user equipment (UE) is configured to use the updated SI for the other CC beginning at the next time. Apparatus and computer readable media are also described.

15 Claims, 5 Drawing Sheets

(58) Field of Classification Search
USPC ....... 370/312, 328, 252, 336, 280, 330, 348; 375/130, E1.002, E1.033, 132
See application file for complete search history.

(56) References Cited

U.S. PATENT DOCUMENTS

| | | | |
|---|---|---|---|
| 2009/0221293 A1* | 9/2009 | Petrovic | H04W 48/10 455/450 |
| 2010/0272015 A1* | 10/2010 | Chmiel | H04W 48/12 370/328 |
| 2010/0323714 A1* | 12/2010 | Schmidt | H04W 48/18 455/456.1 |
| 2011/0019615 A1* | 1/2011 | Krco | H04W 48/12 370/328 |
| 2011/0034165 A1* | 2/2011 | Hsu | H04W 36/0088 455/423 |
| 2011/0081898 A1* | 4/2011 | Park | H04L 5/0007 455/418 |
| 2011/0117912 A1* | 5/2011 | Mahajan et al. | 455/434 |

OTHER PUBLICATIONS

3GPP TSG-RAN WG2 #68, Ericsson, ST-Ericsson, "System Information Change", R2-096758, (Oct. 9-13, 2009), (2 pages).
3GPP TSG RAN WG2 #68bis, Qualcomm Incorporated, "System Information Delivery Under Carrier Aggregation", R2-100422, (Jan. 18-22, 2010), (3 pages).
3GPP TSG RAN WG2 #62, Panasonic, "L1 Parameters on System Information for Connected UE", R2-082237, (May 5-9), (3 pages).
3GPP TSG-RAN WG2 Meeting #68bis, Alcatel-Lucent, "Discussion of Carrier Types", R2-100393, (Jan. 18-22, 2010), (3 pages).
3GPP TSG-RAN WG2 Meeting #69bis, Huawei, "Dedicated Signaling for CC Addition and SI Change", (Apr. 12-16, 2010), (3 pages).
"$3^{rd}$ Generation Partnership Project; Technical Specification Group Radio Access Network; Feasibility study for Further Advancements for E-UTRA (LTE-Advanced)(Release 9)", 3GPP TR 36.912 V9.1.0, Dec. 2009, 58 pgs.
"$3^{rd}$ Generation Partnership Project; Technical Specification Group Radio Access Network; Evolved Universal Terrestrial Radio Access (E-UTRA) Radio Resource Control (RRC); Protocol specification (Release 9)", 3GPP TS 36.331 V9.1.0, Dec. 2009, 233 pgs.
"Report of 3GPP TSG RAN WG2 meeting #68", ETSI MCC, TSG-RAN Working Group 2 meeting #68bis, R2-100826, Jan. 2010, 188 pgs.
"System Information Acquisition for Carrier Aggregation", Research In Motion, UK Limited, 3GPP TSG RAN WG2 Meeting #68bis, R2-100413, Jan. 2010, 4 pgs.
"Remaining Issues in System Information Delivery", Samsung, 3GPP TSG RAN WG2 #68bis, R2-100536, Jan. 2010, 2 pgs.
"$3^{rd}$ Generation Partnership Project; Technical Specification Group GSM/EDGE Radio Access Network; Mobile radio interface layer 3 specification; Radio Resource Control (RRC) protocol (Release 9)", 3GPP TS 44.018 V9.3.0, Section 10.5.2.38, Dec. 2009, 17 pgs.
"$3^{rd}$ Generation Partnership Project: Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", 3GPP TS 36.300, V9.2.0, Dec. 2009, 100 pgs.
"Primary Component Carrier", Nokia Siemens Networks et al., 3GPP TSG-RAN WG2 Meeting #69, R2-101075, Feb. 2010, 2 pgs.

* cited by examiner

SYSTEM INFORMATION UPDATE FOR CARRIER AGGREGATION

CROSS-REFERENCE TO RELATED APPLICATION

This patent application claims priority under 35 U.S.C. §119(e) from U.S. Provisional Patent Application No. 61/304,562, filed Feb. 15, 2010, the disclosure of which is incorporated by reference herein in its entirety.

TECHNICAL FIELD

The exemplary and non-limiting embodiments of this invention relate generally to wireless communication systems, methods, devices and computer programs and, more specifically, relate to providing system information update for a carrier aggregation system.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
BW bandwidth
CA carrier aggregation
CC component carrier
CDM code division multiplexing
DL downlink (eNB towards UE)
eNB E-UTRAN Node B (evolved Node B)
EPC evolved packet core
E-UTRAN evolved UTRAN (LTE)
HARQ hybrid automatic repeat request
LTE long term evolution of UTRAN (E-UTRAN)
MAC medium access control (layer 2, L2)
MM/MME mobility management/mobility management entity
Node B base station
O&M operations and maintenance
OFDMA orthogonal frequency division multiple access
PCC primary component carrier
PDCP packet data convergence protocol
PHY physical (layer 1, L1)
RLC radio link control
RRC radio resource control
RRM radio resource management
SC-FDMA single carrier, frequency division multiple access
SCC secondary component carrier
SFN system frame number
S-GW serving gateway
SI system information
TTI transmission time interval
UE user equipment, such as a mobile station or mobile terminal
UL uplink (UE towards eNB)
UTRAN universal terrestrial radio access network A communication system known as evolved UTRAN (E-UTRAN, also referred to as UTRAN-LTE or as E-UTRA) has been specified within 3GPP. The DL access technique is OFDMA, and the UL access technique is SC-FDMA.

One specification of interest is 3GPP TS 36.300, V9.2.0 (2010-01), "3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 9)", incorporated by reference herein in its entirety.

FIG. 1 reproduces FIG. 4-1 of 3GPP TS 36.300, and shows the overall architecture of the E-UTRAN system. The E-UTRAN system includes eNBs, providing the E-UTRA user plane (PDCP/RLC/MAC/PHY) and control plane (RRC) protocol terminations towards the UE (not shown). The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many-to-many relationship between MMEs/S-GW and eNBs.

The eNB hosts the following functions:
 functions for RRM: Radio Bearer Control, Radio Admission Control, Connection Mobility Control, Dynamic allocation of resources to UEs in both UL and DL (scheduling);
 IP header compression and encryption of the user data stream;
 selection of a MME at UE attachment;
 routing of User Plane data towards the Serving Gateway;
 scheduling and transmission of paging messages (originated from the MME);
 scheduling and transmission of broadcast information (originated from the MME or O&M); and
 a measurement and measurement reporting configuration for mobility and scheduling.

Of particular interest herein are the further releases of 3GPP LTE targeted towards future IMT-Advanced systems, referred to herein for convenience simply as LTE-Advanced (LTE-A). LTE-A is directed toward extending and optimizing the 3GPP LTE Release 8 radio access technologies to provide higher data rates at very low cost. LTE-A will most likely be part of LTE Release 10. LTE-A is expected to use a mix of local area and wide area optimization techniques to fulfill the ITU-R requirements for IMT-Advanced while keeping the backward compatibility with LTE Release 8. Topics that are included within the ongoing study item include bandwidth extensions beyond 20 MHz, among others.

The bandwidth extension beyond 20 MHz in LTE-Advanced may be done via carrier aggregation (CA), in which several Release 8 compatible carriers are aggregated together to form a system bandwidth (aggregations of larger or smaller component carriers is also possible). This is shown by example at FIG. 2 in which there are 5 Release 8 compatible CCs aggregated to form one larger LTE-Advanced bandwidth. A purpose for aggregating individual e.g. 20 MHz Release 8 compatible component carriers (CCs) is that each existing Release 8 terminal can receive and/or transmit on one of the CCs, whereas future LTE-Advanced terminals could potentially receive/transmit on multiple CCs at the same time, thus having support for a large bandwidth. FIG. 2 is specific to LTE-Advanced but makes clear the general concept of CA regardless of what size the CCs; for example smaller frequency chunks such as 10 MHz CCs may be aggregated to get a 20 MHz bandwidth and CCs may be made larger than 20 MHz. LTE Release 8 allows bandwidths of 1.4 MHz, 5 MHz and 10 MHz as well as 20 MHz, so any of these may be the size of a CC. See further 3GPP TS 36.912.

A principle of carrier aggregation is illustrated in FIG. 2. In 3GPP Release 8 UEs are assumed to be served by a stand-alone CC, while in LTE-Advanced terminals can receive or transmit simultaneously on multiple aggregated CCs in the same TTI.

A Release 10 UE may not necessarily be scheduled across the entire five CCs shown by example at FIG. 2 (or however many total CCs there are in the whole bandwidth), but rather there may be a subset of CCs for which the UE is configured to use, e.g., via RRC signaling. This avoids the UE having to blind detect on every possible CC in the whole bandwidth to find the appropriate SI, a power intensive operation.

In Release 8, there is only one carrier and the UE keeps up-to-date system information by performing system information (SI) acquisition and SI update upon receiving SI modification notification on that carrier, or by reading a specific parameter (e.g., a 'value tag') in one of the broadcast SI messages (e.g., a SIB1 message). A modification period is used to ensure all the UE within the cell apply changes to system information at specific radio frames (e.g., at modification boundary), see further 3GPP TS 36.331.

For carrier aggregation, a UE maintains valid system information for more than one CC. The SI acquisition on the 'main CC' (e.g., on the PCC) may be implemented as in Release 8. However, applying the Release 8 mechanisms to all CCs (e.g., to the SCCs) may not be feasible. It was agreed in R2-100826, Report of 3GPP TSG RAN WG2 meeting #68 that "Having the UE monitor SI change paging notification on all configured CCs, or have the UE periodically read the SIB1 on all configured CCs, is not an acceptable solution".

For carrier aggregation, a UE maintains valid system information for the PCC and for one or more SCCs. In regards to UE power consumption and complexity, applying the Release 8 mechanisms to all CCs is not practical. The modification period of each CC may differ. Further, the timing of the SI change may be even more problematic as the SFNs may not be aligned across all CCs. The potential to aggregate CCs from non-co-located eNBs may be useful in future releases. In case of non-co-located eNBs, the alignment of SFNs over the CCs may be exceptionally difficult. Therefore, in order to have a future-proof mechanism, it may not be useful to assume that the SFNs (and/or modification periods) are the same across the CCs.

It has been considered to have SI change notification of other CCs in paging message of the anchor cell or serving cell (or the PCC), UEs may read the system information of the other CCs upon receiving such notification. The considered paging message is modified over the paging messages of the previous releases which may imply that the new paging message may not be received by legacy UEs, thus reducing paging capacity. Additionally, such a method ignores that the modification periods may be different in PCC and SCCs. The UE may still need to perform SI acquisition on multiple CC (which results in unnecessary activation of CCs). See further, R2-100413, "System Information Acquisition for Carrier Aggregation" and R2-101075, "Primary Component Carrier".

Another potential approach is to use dedicated RRC signaling with modified SI from either a special cell or any activated CCs. Such a method cannot ensure that all the UEs receive and correctly decode the dedicated signaling for SI updates at the same time, which may lead to UEs within a cell having differing versions of the current system information at a given time. See further, R2-100536, "Remaining Issues in System Information Delivery".

In cellular systems, a specific 'starting time' parameter may be used to indicate the moment, when the new parameters are taken into use. The addition and removal of new carriers in the frequency hopping sequence may be performed with a command including the 'starting time' parameter in order to ensure that all UEs change the hopping sequence at the same time (see further 3GPP TS 44.018, section 10.5.2.38). However, the starting time is limited to a single event, while in a case where multiple events may need to be signaled, for example, where multiple SI of multiple CCs may be updated, but they are taken into use at different times (e.g., at a modification boundary of the given CC). Additionally, modification boundary information may refer to repetitive instances of time, while a starting time refers to a single point of time.

What is needed is a solution for SI updates for multiple CCs so that the new information may be used by all UEs at the correct time even when the multiple CCs are not aligned.

SUMMARY

The below summary section is intended to be merely exemplary and non-limiting.

The foregoing and other problems are overcome, and other advantages are realized, by the use of the exemplary embodiments of this invention.

In a first aspect thereof an exemplary embodiment of this invention provides a method for providing system information updates for a carrier aggregation system. The method includes receiving at a UE, on a first CC, a message including updated system information for at least one other CC and an indication of a first time. The UE is configured for a set of CCs. The method also includes, for each other CC of the configured set of CCs, determining a next time for the other CC which begins after the first time and configuring the UE to use the updated system information for the other CC beginning at the next time.

In another aspect thereof an exemplary embodiment of this invention provides a method for providing system information updates for a carrier aggregation system. The method includes, for each other CC of a configured set of CCs, determining a start time for the other CC when updated system information for the other CC becomes valid. Determining a first time prior to each start time for the at least one other CC is also included in the method. A message including the updated system information for the at least one other CC and an indication of the first time is sent on a first CC.

In a further aspect thereof an exemplary embodiment of this invention provides a computer readable medium tangibly encoded with a computer program executable by a processor to perform actions for providing system information updates for a carrier aggregation system. The actions include receiving at a UE, on a first CC, a message includes updated system information for at least one other CC and an indication of a first time. The UE is configured for a set of CCs. The actions also includes, for each other CC of the configured set of CCs, determining a next time for the other CC which begins after the first time and configuring the UE to use the updated system information for the other CC beginning at the next time.

In another aspect thereof an exemplary embodiment of this invention provides a computer readable medium tangibly encoded with a computer program executable by a processor to perform actions for providing system information updates for a carrier aggregation system. The actions include, for each other CC of a configured set of CCs, determining a start time for the other CC when updated system information for the other CC becomes valid. Determining a first time prior to each start time for the at least one other CC is also included in the actions. A message including the updated system information for the at least one other CC and an indication of the first time is sent on a first CC.

In a further aspect thereof an exemplary embodiment of this invention provides an apparatus for providing system information updates for a carrier aggregation system. The apparatus includes at least one processor; and at least one memory including computer program code. The at least one memory and the computer program code are configured to, with the at least one processor, cause the apparatus to perform actions. The actions include to receive at a UE, on a first CC, a message includes updated system information for at least one other CC and an indication of a first time. The UE is configured for a set of CCs. The actions also includes, for each other CC of the configured set of CCs, to determine a next time for the other CC which begins after the first time and to configure the UE to use the updated system information for the other CC beginning at the next time.

In another aspect thereof an exemplary embodiment of this invention provides an apparatus for providing system information updates for a carrier aggregation system. The apparatus includes at least one processor; and at least one memory including computer program code. The at least one memory and the computer program code are configured to, with the at least one processor, cause the apparatus to perform actions. The actions include, for each other CC of a configured set of CCs, to determine a start time for the other CC when updated system information for the other CC becomes valid. To determine a first time prior to each start time for the at least one other CC is also included in the actions. The actions also include to send a message including the updated system information for the at least one other CC and an indication of the first time on a first CC.

In a further aspect thereof an exemplary embodiment of this invention provides an apparatus for providing system information updates for a carrier aggregation system. The apparatus includes means for receiving at a UE, on a first CC, a message includes updated system information for at least one other CC and an indication of a first time. The UE is configured for a set of CCs. The apparatus also includes means for determining, for each other CC of the configured set of CCs, a next time for the other CC which begins after the first time and for configuring the UE to use the updated system information for the other CC beginning at the next time.

In another aspect thereof an exemplary embodiment of this invention provides an apparatus for providing system information updates for a carrier aggregation system. The apparatus includes means for determining, for each other CC of a configured set of CCs, a start time for the other CC when updated system information for the other CC becomes valid. Means for determining a first time prior to each start time for the at least one other CC is also included in the apparatus. The apparatus also includes means for sending a message including the updated system information for the at least one other CC and an indication of the first time on a first CC.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Figure 3:
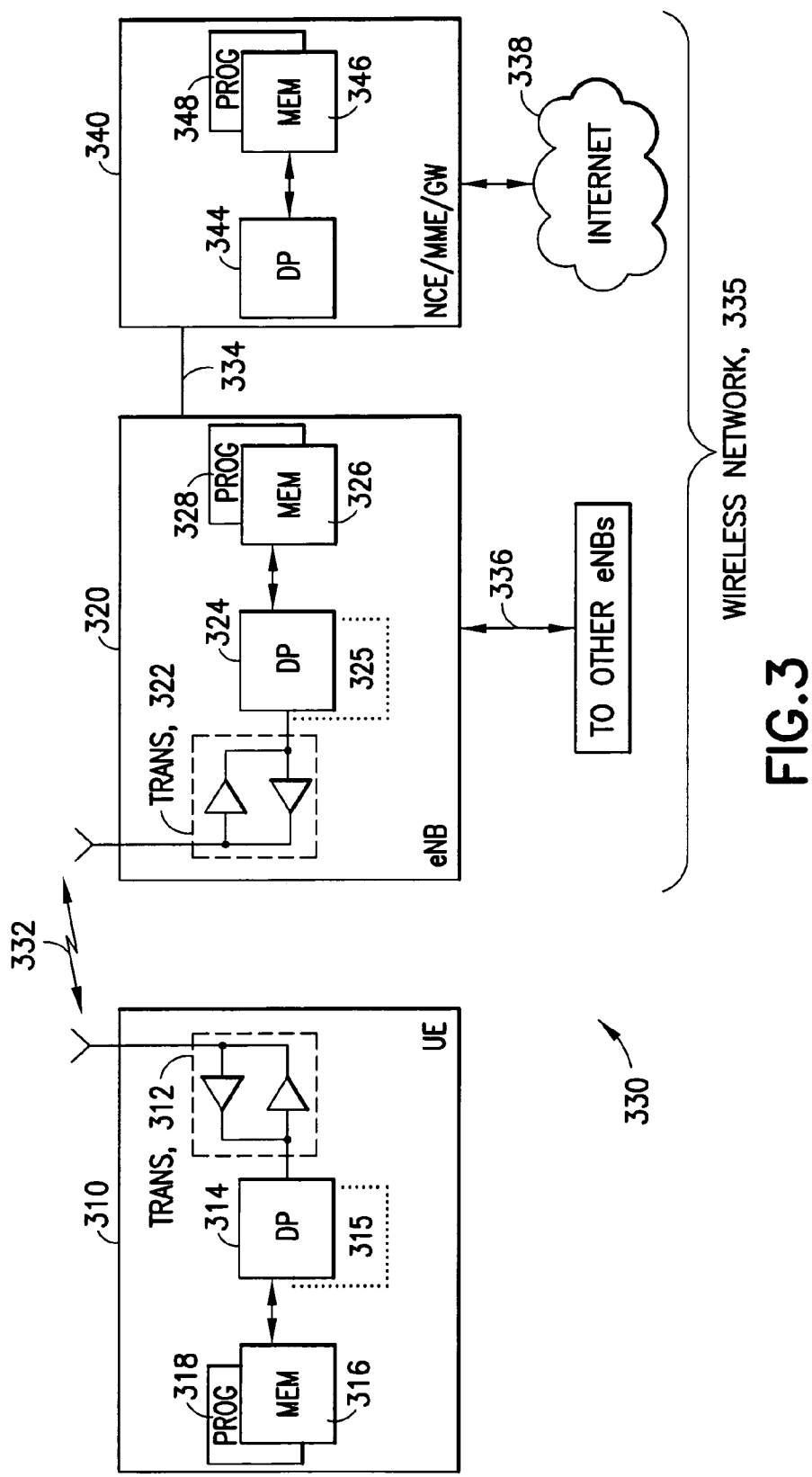
FIG. 3 shows a simplified block diagram of exemplary electronic devices that are suitable for use in practicing various exemplary embodiments of this invention.

Before describing in further detail various exemplary embodiments of this invention, reference is made to FIG. 3 for illustrating a simplified block diagram of various electronic devices and apparatus that are suitable for use in practicing exemplary embodiments of this invention.

Figure 1:
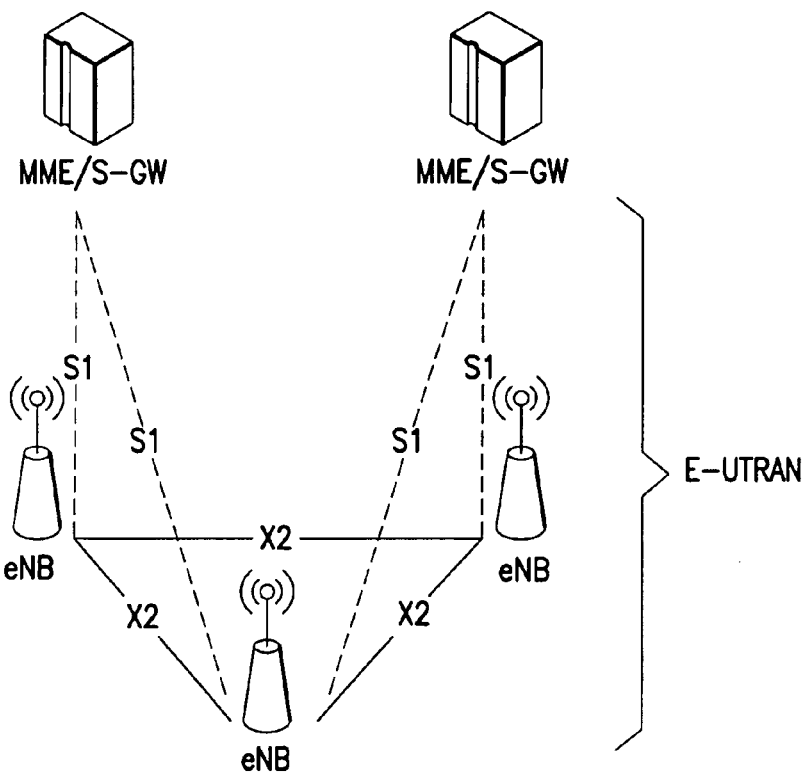
FIG. 1 reproduces FIG. 4-1 of 3GPP TS 36.300, and shows the overall architecture of the E UTRAN system.
Figure 2:
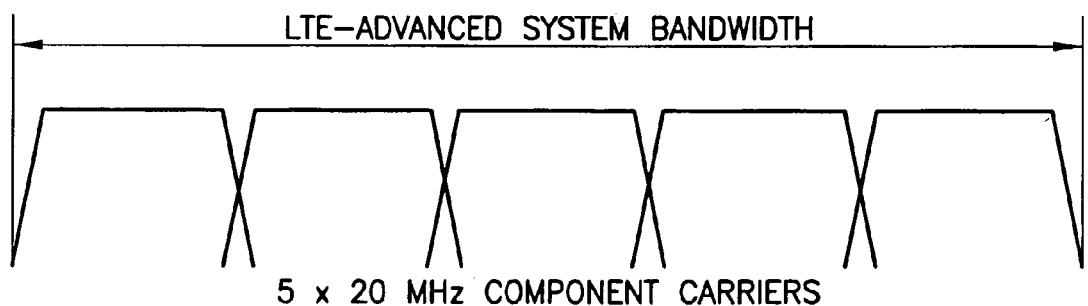
FIG. 2 depicts a schematic diagram of a radio spectrum in which cross-scheduling can be employed, in which five component carrier bandwidths are aggregated into a single LTE-Advanced bandwidth.

In the wireless system 330 of FIG. 3, a wireless network 335 is adapted for communication over a wireless link 332 with an apparatus, such as a mobile communication device which may be referred to as a UE 310, via a network access node, such as a Node B (base station), and more specifically an eNB 320. The network 335 may include a network control element (NCE) 340 that may include the MME/SGW functionality shown in FIG. 1, and which provides connectivity with a network, such as a telephone network and/or a data communications network (e.g., the internet 338).

The UE 310 includes a controller, such as a computer or a data processor (DP) 314, a computer-readable memory medium embodied as a memory (MEM) 316 that stores a program of computer instructions (PROG) 318, and a suitable wireless interface, such as radio frequency (RF) transceiver 312, for bidirectional wireless communications with the eNB 320 via one or more antennas.

The eNB 320 also includes a controller, such as a computer or a data processor (DP) 324, a computer-readable memory medium embodied as a memory (MEM) 326 that stores a program of computer instructions (PROG) 328, and a suitable wireless interface, such as RF transceiver 322, for communication with the UE 310 via one or more antennas. The eNB 320 is coupled via a data/control path 334 to the NCE 340. The path 334 may be implemented as the S1 interface shown in FIG. 1. The eNB 320 may also be coupled to another eNB via data/control path 336, which may be implemented as the X2 interface shown in FIG. 1.

The NCE 340 includes a controller, such as a computer or a data processor (DP) 344, a computer-readable memory medium embodied as a memory (MEM) 346 that stores a program of computer instructions (PROG) 348.

At least one of the PROGs 318, 328 and 348 is assumed to include program instructions that, when executed by the associated DP, enable the device to operate in accordance with exemplary embodiments of this invention, as will be discussed below in greater detail.

That is, various exemplary embodiments of this invention may be implemented at least in part by computer software executable by the DP 314 of the UE 310; by the DP 324 of the eNB 320; and/or by the DP 344 of the NCE 340, or by hardware, or by a combination of software and hardware (and firmware).

The UE 310 and the eNB 320 may also include dedicated processors, for example scheduler 315 and resource scheduler 325.

In general, the various embodiments of the UE 310 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 316, 326 and 346 may be of any type suitable to the local technical environment and may be implemented using any suitable data storage technology, such as semiconductor based memory devices, flash memory, magnetic memory devices and systems, optical memory devices and systems, fixed memory and removable memory. The DPs 314, 324 and 344 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 312 and 322) may be of any type suitable to the local technical environment and may be implemented using any suitable communication technology such as individual transmitters, receivers, transceivers or a combination of such components.

Figure 4:
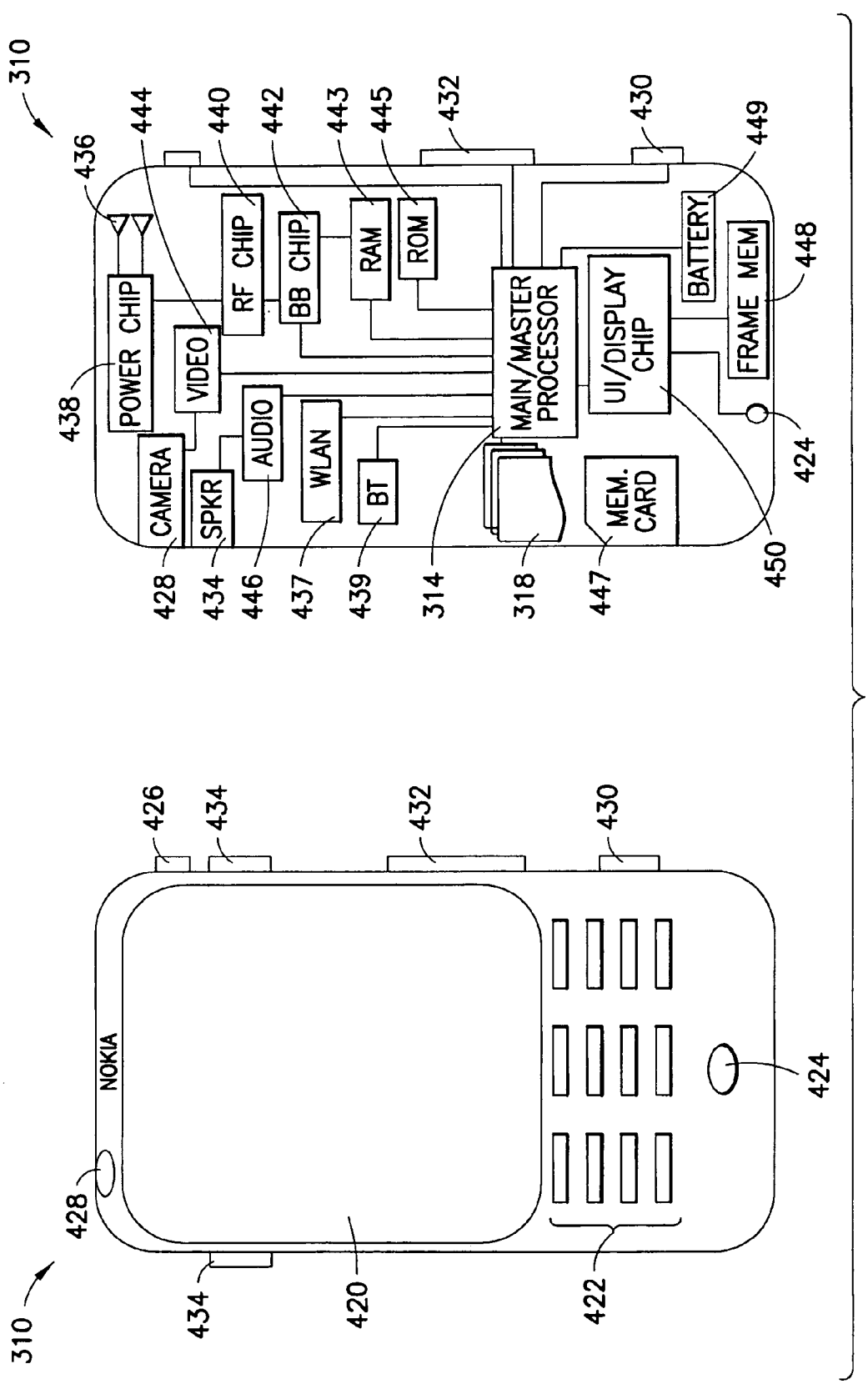
FIG. 4 shows a more particularized block diagram of an exemplary user equipment such as that shown at FIG. 3.

FIG. 4 illustrates further detail of an exemplary UE in both plan view (left) and sectional view (right), and the invention may be embodied in one or some combination of those more function-specific components. At FIG. 4 the UE 310 has a graphical display interface 420 and a user interface 422 illustrated as a keypad but understood as also encompassing touch-screen technology at the graphical display interface 420 and voice-recognition technology received at the microphone 424. A power actuator 426 controls the device being turned on and off by the user. The exemplary UE 310 may have a camera 428 which is shown as being forward facing (e.g., for video calls) but may alternatively or additionally be rearward facing (e.g., for capturing images and video for local storage). The camera 428 is controlled by a shutter actuator 430 and optionally by a zoom actuator 432 which may alternatively function as a volume adjustment for the speaker(s) 434 when the camera 428 is not in an active mode.

Within the sectional view of FIG. 4 are seen multiple transmit/receive antennas 436 that are typically used for cellular communication. The antennas 436 may be multi-band for use with other radios in the UE. The operable ground plane for the antennas 436 is shown by shading as spanning the entire space enclosed by the UE housing though in some embodiments the ground plane may be limited to a smaller area, such as disposed on a printed wiring board on which the power chip 438 is formed. The power chip 438 controls power amplification on the channels being transmitted and/or across the antennas that transmit simultaneously where spatial diversity is used, and amplifies the received signals. The power chip 438 outputs the amplified received signal to the radio-frequency (RF) chip 440 which demodulates and downconverts the signal for baseband processing. The baseband (BB) chip 442 detects the signal which is then converted to a bit-stream and finally decoded. Similar processing occurs in reverse for signals generated in the apparatus 310 and transmitted from it.

Signals to and from the camera 428 pass through an image/video processor 444 which encodes and decodes the various image frames. A separate audio processor 446 may also be present controlling signals to and from the speakers 434 and the microphone 424. The graphical display interface 420 is refreshed from a frame memory 448 as controlled by a user interface chip 450 which may process signals to and from the display interface 420 and/or additionally process user inputs from the keypad 422 and elsewhere.

Certain embodiments of the UE 310 may also include one or more secondary radios such as a wireless local area network radio WLAN 437 and a Bluetooth® radio 439, which may incorporate an antenna on-chip or be coupled to an off-chip antenna. Throughout the apparatus are various memories such as random access memory RAM 443, read only memory ROM 445, and in some embodiments removable memory such as the illustrated memory card 447. The various programs 318 are stored in one or more of these memories. All of these components within the UE 310 are normally powered by a portable power supply such as a battery 449.

Processors 438, 440, 442, 444, 446, 450, if embodied as separate entities in a UE 310 or eNB 320, may operate in a slave relationship to the main processor 314, 324, which may then be in a master relationship to them. Embodiments of this invention are most relevant to the radio frequency circuitry, though it is noted that other embodiments need not be disposed there but may be disposed across various chips and memories as shown or disposed within another processor that combines some of the functions described above for FIG. 4. Any or all of these various processors of FIG. 4 access one or more of the various memories, which may be on-chip with the processor or separate therefrom. Similar function-specific components that are directed toward communications over a network broader than a piconet (e.g., components 436, 438, 440, 442-445 and 447) may also be disposed in exemplary embodiments of the access node 320, which may have an array of tower-mounted antennas rather than the two shown at FIG. 4.

Note that the various chips (e.g., 438, 440, 442, etc.) that were described above may be combined into a fewer number than described and, in a most compact case, may all be embodied physically within a single chip.

In an exemplary embodiment in accordance with the invention, the eNB is configured to include modification boundary information of the concerned component carriers with SI modification in dedicated signaling. The UE may consider the received SI update as valid only from the indicated timing. Thus, even if all the UEs do not receive the dedicated signaling at the same time, the SI update still has the same validation time across UEs within the special cell (e.g., an anchor cell).

The modification boundary information may be linked to a system frame number (SFN) of a specific cell which is known to the UE as the UE performs normal system acquisition procedures of the cell as in R8/9. The eNB can signal the correct timing based on an offset if SFN of different cells are not aligned. If the DL timing of different cell is not aligned at the subframe level, the subframe number may be included.

In another embodiment the modification boundary information can also be linked to system frame number (SFN) of the concerned component carrier with the SI update if it is known to the UE e.g. upon configuration of concerned component carrier.

Using dedicated signaling for an SI update avoids the UE reading SI on multiple cells. Linking the modification boundary information (or validation time of an SI update) to the SFN is simple without requiring the UE to acquire modification period details or other SI details on other cells, while still enabling UEs within the cell to have the same validation time for the SI update.

Figure 5:
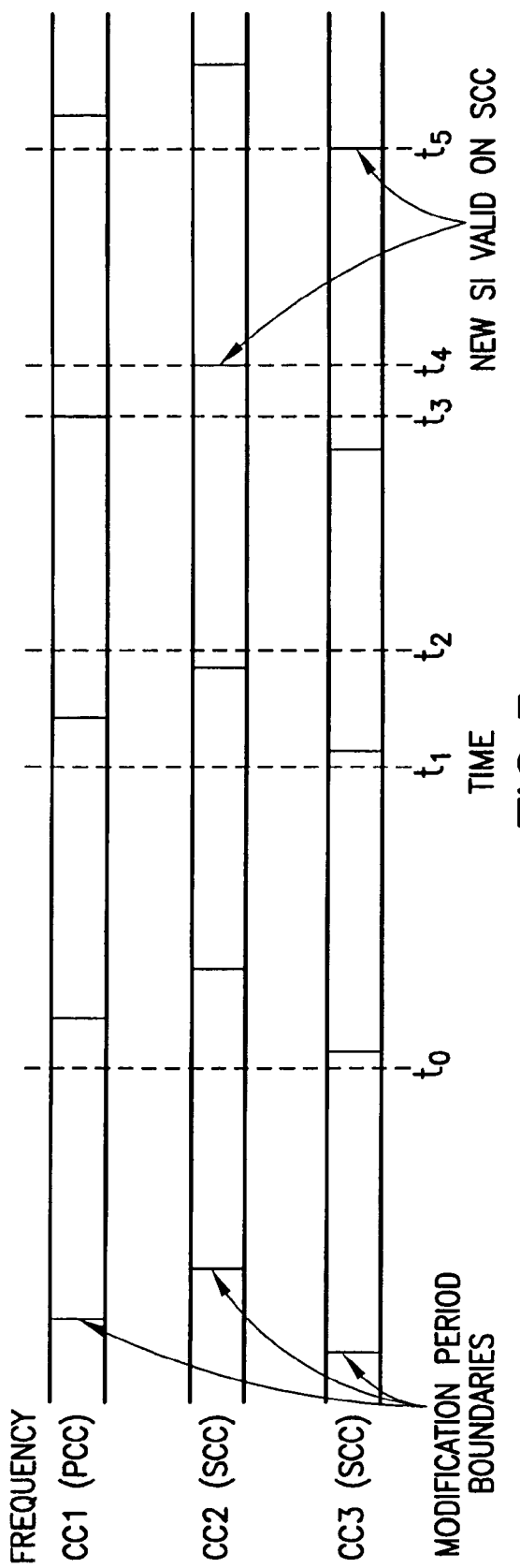
FIG. 5 illustrates a frequency/time chart in accordance with an exemplary embodiment of this invention.

FIG. 5 illustrates a frequency/time chart in accordance with an exemplary embodiment of this invention. CC1, CC2 and CC3 use separate frequencies as described above.

At $t_0$, the initial conditions are such that the UE has been configured with CC1 as the primary CC (PCC). Two SCCs (CC2 and CC3) are configured, but not yet activated. The UE has been informed of the SI for all CCs including the current modification periods and the offsets of the SFNs between the PCC and SCCs. In a non-limiting example, the PCC is a carrier which is accessible to UEs of all existing LTE releases.

Within the timeframe indicated by $t_1$ and $t_2$ the eNB transmits (to each UE) the updated SI of CC2 and CC3. This transmission is sent over CC1 as dedicated signaling. The eNB does not need to transmit the updated SI messages at a specific time with respect to the modification periods of CC1, CC2 or CC3.

An updated SI message includes the new SI of CC2 and CC3 and may further include timing information.

As a non-limiting example, the timing information may indicate a CC1 SFN. The updated SI will be valid for the next CC2/CC3 modification period after the indicated CC1 SNF. As shown, the indicated CC1 SFN begins at $t_3$. At $t_4$ a modification period of CC2 begins and the updated SI on CC2 is valid. Similarly, at $t_5$ a modification period of CC3 begins and the updated SI on CC3 is valid.

Using the above procedure, it is sufficient to refer to the modification periods of other CCs in order to indicate a modification period. During this procedure, additional SCCs may remain in a non-activated state if not needed for user data transfer. This saves power at the UE as these SCCs need not be monitored.

The modification boundary information may be linked to the SFN of the special cell which is known to the UE as the UE performs normal system acquisition procedure of such cell as in R8/9. The eNB can calculate an offset if the SFN of different cells are not aligned and then the eNB can signal the correct timing. If DL timing of different cell is not aligned at a subframe level, a subframe number may also be included.

The modification boundary information may also be linked to a SFN of the concerned cell with the SI update if it is known by the UE, e.g. upon configuration of the concerned cell.

Upon receiving the updated SI and the timing information, the UE determines, based on the timing information, the appropriate time to begin using the updated SI on each CC indicated/affected. The UE may then configure itself to use the updated SI for the CCs at the appropriate time.

For example, the UE may use the configuration information of the CC to determine the next modification boundary for that CC which is to occur following the indicated time (e.g., the start of a system frame on the PCC). The UE may then update the SI for that CC in order to use the appropriate SI at the correct time.

Based on the foregoing it should be apparent that the exemplary embodiments of this invention provide a method, apparatus and computer program(s) to providing system information update for a carrier aggregation system.

Figure 6:
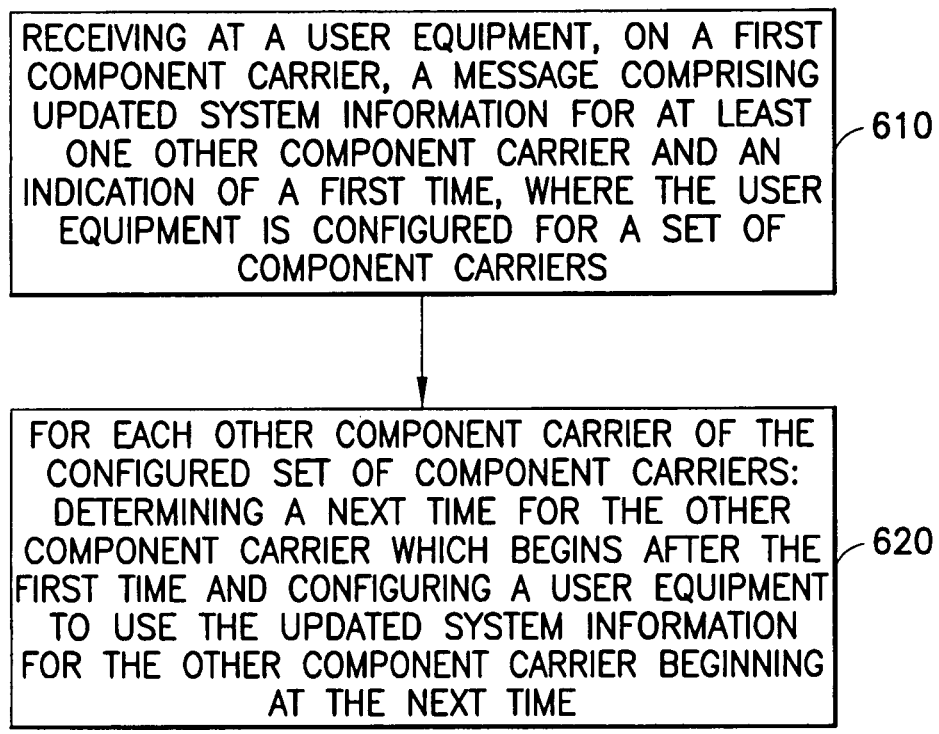
FIG. 6 is a logic flow diagram that illustrates the operation of an exemplary method, and a result of execution of computer program instructions embodied on a computer readable memory, in accordance with various exemplary embodiments of this invention.

FIG. 6 is a logic flow diagram that illustrates the operation of a method, and a result of execution of computer program instructions, in accordance with the exemplary embodiments of this invention. In accordance with these exemplary embodiments a method performs, at Block 610, a step of receiving at a user equipment, on a first component carrier (e.g., CC1 in FIG. 5), a message comprising updated system information for at least one other component carrier and an indication of a first time (e.g., $t_3$ in FIG. 5). The user equipment is configured for a set of component carriers (e.g., CC1, CC2 and CC3 in FIG. 5). The method also includes, for each other component carrier of the configured set of component carriers (e.g., CC2 and CC3 in FIG. 5), determining a next time for the other component carrier which begins after the first time (e.g., the next time is $t_4$ for CC2 and the next time is $t_5$ for CC3 in FIG. 5) and configuring a user equipment to use the updated system information for the other component carrier beginning at the next time at Block 620.

The various blocks shown in FIG. 6 may be viewed as method steps, and/or as operations that result from operation of computer program code, and/or as a plurality of coupled logic circuit elements constructed to carry out the associated function(s).

An exemplary embodiment in accordance with this invention is a method for providing system information updates for a carrier aggregation system. The method includes receiving at a UE (e.g., by a receiver), on a first CC, a message including updated system information for at least one other CC and an indication of a first time. The UE is configured for a set of CCs. The method also includes, for each other CC of the configured set of CCs, determining (e.g., by a processor) a next time for the other CC which begins after the first time and configuring (e.g., by a processor) the UE to use the updated system information for the other CC beginning at the next time.

In a further exemplary embodiment of the method above, the first time is a start of a system frame on the first CC (alternatively, the first time may be the end point, the middle or any other point of reference in relation to the system frame). The indication may include a system frame number for the system frame on the first CC.

In an additional exemplary embodiment of the method above, the first time is the start of a system frame on one of the at least one other CC.

In a further exemplary embodiment of any one of the methods above, determining the next time for the at least one other CC includes determining a next modification period boundary for the other CC which occurs after the first time. Determining the next time may be based at least in part on configuration data for the other CC.

In an additional exemplary embodiment of any one of the methods above, modification period boundaries for the first CC and modification period boundaries for the at least one other CC are unaligned.

In a further exemplary embodiment of any one of the methods above, the indication includes an offset.

An additional exemplary embodiment in accordance with this invention is a method for providing system information updates for a carrier aggregation system. The method includes, for each other CC of a configured set of CCs, determining (e.g., by a processor) a start time for the other CC when updated system information for the other CC becomes valid. Determining (e.g., by a processor) a first time prior to each start time for the at least one other CC is also included in the method. A message including the updated system information for the at least one other CC and an indication of the first time is sent (e.g., by a transmitter) on a first CC.

In a further exemplary embodiment of the method above, the first time is a start of a system frame on the first CC. The indication may include a system frame number for the system frame on the first CC. Determining the first time may include determining a system frame which starts prior to each start time.

In an additional exemplary embodiment of any one of the methods above, modification period boundaries for the first CC and modification period boundaries for the at least one other CC are unaligned.

In a further exemplary embodiment of any one of the method above, the first time is the start of a system frame on one of the at least one other CC.

In an additional exemplary embodiment of any one of the methods above, the indication includes an offset. Determining the first time may include determining the offset such that the offset indicates a time prior to each start time.

A further embodiment in accordance with this invention is a computer readable medium tangibly encoded with a computer program executable by a processor to perform actions for providing system information updates for a carrier aggregation system. The actions include receiving at a UE, on a first CC, a message includes updated system information for at least one other CC and an indication of a first time. The UE is configured for a set of CCs. The actions also includes, for each other CC of the configured set of CCs, determining a next time for the other CC which begins after the first time and configuring the UE to use the updated system information for the other CC beginning at the next time.

In an additional exemplary embodiment of the computer readable medium above, the first time is a start of a system frame on the first CC. The indication may include a system frame number for the system frame on the first CC.

In a further exemplary embodiment of the computer readable medium above, the first time is the start of a system frame on one of the at least one other CC.

In an additional exemplary embodiment of any one of the computer readable media above, determining the next time for the at least one other CC includes determining a next modification period boundary for the other CC which occurs after the first time. Determining the next time may be based at least in part on configuration data for the other CC.

In a further exemplary embodiment of any one of the computer readable media above, modification period boundaries for the first CC and modification period boundaries for the at least one other CC are unaligned.

In an additional exemplary embodiment of any one of the computer readable media above, the indication includes an offset.

In a further exemplary embodiment of any one of the computer readable media above, the computer readable medium is a non-transitory computer readable medium (e.g., RAM, ROM, flash memory, etc.).

An additional exemplary embodiment in accordance with this invention is a computer readable medium tangibly encoded with a computer program executable by a processor to perform actions for providing system information updates for a carrier aggregation system. The actions include, for each other CC of a configured set of CCs, determining a start time for the other CC when updated system information for the other CC becomes valid. Determining a first time prior to each start time for the at least one other CC is also included in the actions. A message including the updated system information for the at least one other CC and an indication of the first time is sent on a first CC.

In a further exemplary embodiment of the computer readable medium above, the first time is a start of a system frame on the first CC. The indication may include a system frame number for the system frame on the first CC. Determining the first time may include determining a system frame which starts prior to each start time.

In an additional exemplary embodiment of any one of the computer readable media above, modification period boundaries for the first CC and modification period boundaries for the at least one other CC are unaligned.

In a further exemplary embodiment of any one of the computer readable media above, the first time is the start of a system frame on one of the at least one other CC.

In an additional exemplary embodiment of any one of the computer readable media above, the indication includes an offset. Determining the first time may include determining the offset such that the offset indicates a time prior to each start time.

In a further exemplary embodiment of any one of the computer readable media above, the computer readable medium is a non-transitory computer readable medium (e.g., ROM, RAM, flash memory, etc.).

An additional exemplary embodiment in accordance with this invention is an apparatus for providing system information updates for a carrier aggregation system. The apparatus includes at least one processor; and at least one memory including computer program code. The at least one memory and the computer program code are configured to, with the at least one processor, cause the apparatus to perform actions. The actions include to receive at a UE, on a first CC, a message includes updated system information for at least one other CC and an indication of a first time. The UE is configured for a set of CCs. The actions also includes, for each other CC of the configured set of CCs, to determine a next time for the other CC which begins after the first time and to configure the UE to use the updated system information for the other CC beginning at the next time.

In a further exemplary embodiment of the apparatus above, the first time is a start of a system frame on the first CC. The indication may include a system frame number for the system frame on the first CC.

In an additional exemplary embodiment of the apparatus above, the first time is the start of a system frame on one of the at least one other CC.

In a further exemplary embodiment of any one of the apparatus above, determining the next time for the at least one other CC includes determining a next modification period boundary for the other CC which occurs after the first time. Determining the next time may be based at least in part on configuration data for the other CC.

In an additional exemplary embodiment of any one of the apparatus above, modification period boundaries for the first CC and modification period boundaries for the at least one other CC are unaligned.

In a further exemplary embodiment of any one of the apparatus above, the indication includes an offset.

An additional exemplary embodiment in accordance with this invention is an apparatus for providing system information updates for a carrier aggregation system. The apparatus includes at least one processor; and at least one memory including computer program code. The at least one memory and the computer program code are configured to, with the at least one processor, cause the apparatus to perform actions. The actions include, for each other CC of a configured set of CCs, to determine a start time for the other CC when updated system information for the other CC becomes valid. To determine a first time prior to each start time for the at least one other CC is also included in the actions. The actions also include to send a message including the updated system information for the at least one other CC and an indication of the first time on a first CC.

In a further exemplary embodiment of the apparatus above, the first time is a start of a system frame on the first CC. The indication may include a system frame number for the system frame on the first CC. Determining the first time may include determining a system frame which starts prior to each start time.

In an additional exemplary embodiment of any one of the apparatus above, modification period boundaries for the first CC and modification period boundaries for the at least one other CC are unaligned.

In a further exemplary embodiment of the apparatus above, the first time is the start of a system frame on one of the at least one other CC.

In an additional exemplary embodiment of any one of the apparatus above, the indication includes an offset. Determining the first time may include determining the offset such that the offset indicates a time prior to each start time.

A further exemplary embodiment in accordance with this invention is an apparatus for providing system information updates for a carrier aggregation system. The apparatus includes means for receiving (e.g., a receiver) at a UE, on a first CC, a message includes updated system information for at least one other CC and an indication of a first time. The UE is configured for a set of CCs. The apparatus also includes means for determining (e.g., a processor), for each other CC of the configured set of CCs, a next time for the other CC which begins after the first time and for configuring the UE to use the updated system information for the other CC beginning at the next time.

In an additional exemplary embodiment of the apparatus above, the first time is a start of a system frame on the first CC. The indication may include a system frame number for the system frame on the first CC.

In a further exemplary embodiment of the apparatus above, the first time is the start of a system frame on one of the at least one other CC.

In an additional exemplary embodiment of any one of the apparatus above, the means for determining the next time for the at least one other CC includes means for determining a next modification period boundary for the other CC which occurs after the first time. Determining the next time may be based at least in part on configuration data for the other CC.

In a further exemplary embodiment of any one of the apparatus above, modification period boundaries for the first CC and modification period boundaries for the at least one other CC are unaligned.

In an additional exemplary embodiment of any one of the apparatus above, the indication includes an offset.

A further exemplary embodiment in accordance with this invention is an apparatus for providing system information updates for a carrier aggregation system. The apparatus includes means for determining (e.g., a processor), for each other CC of a configured set of CCs, a start time for the other CC when updated system information for the other CC becomes valid. Means for determining (e.g., a processor) a first time prior to each start time for the at least one other CC is also included in the apparatus. The apparatus also includes means for sending (e.g., a transmitter) a message including the updated system information for the at least one other CC and an indication of the first time on a first CC.

In an additional exemplary embodiment of the apparatus above, the first time is a start of a system frame on the first CC. The indication may include a system frame number for the system frame on the first CC. The means for determining the first time may include means for determining a system frame which starts prior to each start time.

In a further exemplary embodiment of any one of the apparatus above, modification period boundaries for the first CC and modification period boundaries for the at least one other CC are unaligned.

In an additional exemplary embodiment of any one of the apparatus above, the first time is the start of a system frame on one of the at least one other CC.

In a further exemplary embodiment of any one of the apparatus above, the indication includes an offset. The means for determining the first time may include means for determining the offset such that the offset indicates a time prior to each start time.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems such as for example (WLAN, UTRAN, GSM as appropriate).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., SFN, etc.) are not intended to be limiting in any respect, as these parameters may be identified by any suitable names. Further, the formulas and expressions that use these various parameters may differ from those expressly disclosed herein. Further, the various names assigned to different channels (e.g., PCC, SCC, CC, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising: for each other component carrier of a configured set of component carriers: determining by one or more processors a start time for said each other component carrier when updated system information for said each other component carrier becomes valid;
    determining by the one or more processors, a first time prior to each start time for said each other component carrier; and
    sending, to a user equipment on a first component carrier, a message comprising the updated system information for said each other component carrier and an indication of the first time to indicate an appropriate time to begin using the updated system information for said each other component carrier, wherein the updated system information is used at least in part for carrier aggregation, wherein prior to sending the message the user equipment is configured with the first component carrier activated for user data transfer, and wherein unless already activated and configured for user data transfer with the user equipment, said each other component carrier is configured but not activated for user data transfer.

2. The method of claim 1, where the first time is a start of a system frame on the first component carrier.

3. The method of claim 2, where the indication comprises a system frame number for the system frame on the first component carrier.

4. The method of claim 2, where determining the first time comprises determining a system frame which starts prior to each start time.

5. The method of claim 1, where modification period boundaries for the first component carrier and modification period boundaries for the at least one other component carrier are unaligned.

6. An apparatus, comprising at least one processor; and at least one memory including computer program code, the at least one memory and the computer program code configured to, with the at least one processor, cause the apparatus to perform at least the following:
    to determine, for each other component carrier of a configured set of component carriers, a start time for the other component carrier when updated system information for the other component carrier becomes valid;
    to determine a first time prior to each start time for the at least one other component carrier; and
    to send, to a user equipment on a first component carrier, a message comprising the updated system information for the at least one other component carrier and an indication of the first time to indicate an appropriate time to begin using the updated system information for the at least one other component carrier, wherein the updated system information is used at least in part for carrier aggregation, wherein prior to sending the message the user equipment is configured with the first component carrier activated for user data transfer, and wherein unless already activated and configured for user data transfer with the user equipment, said each other component carrier is configured but not activated for user data transfer.

7. The apparatus of claim 6, where the first time is a start of a system frame on the first component carrier.

8. The apparatus of claim 7, where the indication comprises a system frame number for the system frame on the first component carrier.

9. The apparatus of claim 7, where the at least one memory and the computer program code are further configured to cause the apparatus, when determining the first time, to determine a system frame which starts prior to each start time.

10. The apparatus of claim 6, where modification period boundaries for the first component carrier and modification period boundaries for the at least one other component carrier are unaligned.

11. A computer program product embodied on a non-transitory computer-readable medium in which a computer program is stored that, when being executed by a computer, is configured to provide instructions to control or carry out:
    for each other component carrier of a configured set of component carriers: determining a start time for the other component carrier when updated system information for the other component carrier becomes valid;
    determining a first time prior to each start time for the at least one other component carrier; and
    sending, to a user equipment on a first component carrier, a message comprising the updated system information for the at least one other component carrier and an indication of the first time to indicate an appropriate time to begin using the updated system information for the at least one other component carrier, wherein the updated system information is used at least in part for carrier aggregation, wherein prior to sending the message the user equipment is configured with the first component carrier activated for user data transfer, and wherein unless already activated and configured for user data transfer with the user equipment, said each other component carrier is configured but not activated for user data transfer.

12. The computer program product of claim 11, where the first time is a start of a system frame on the first component carrier.

13. The computer program product of claim 12, where the indication comprises a system frame number for the system frame on the first component carrier.

14. The computer program product of claim 12, where determining the first time comprises determining a system frame which starts prior to each start time.

15. The computer program product of claim 11, where modification period boundaries for the first component carrier and modification period boundaries for the at least one other component carrier are unaligned.

* * * * *